United States Patent [19]
Mueller-Tamm et al.

[11] 3,882,260
[45] May 6, 1975

[54] METHOD OF COATING SHAPED ARTICLES

[75] Inventors: Heinz Mueller-Tamm; Wolfgang Immel, both of Ludwigshafen; Heinrich Mohr; Karl-Heinz Fauth, both of Frankenthal, all of Germany

[73] Assignee: Badische Anilin- & Soda-Fabrik Aktiengesellschaft, Ludwigshafen (Rhine), Germany

[22] Filed: Feb. 7, 1973

[21] Appl. No.: 330,307

[30] Foreign Application Priority Data
Feb. 11, 1972 Germany.................... 2206509

[52] U.S. Cl.......... 428/337; 117/161 UH; 428/516; 427/316
[51] Int. Cl..................... C23c 3/00; B44d 1/09
[58] Field of Search........... 117/138.8 E, 138.8 UA, 117/161 UZ, 139, 100, 31, 47 H

[56] References Cited
UNITED STATES PATENTS

| | | | |
|---|---|---|---|
| 2,928,756 | 3/1960 | Campbell | 117/47 |
| 2,932,323 | 4/1960 | Aries | 117/138.8 E |
| 3,380,882 | 4/1968 | Boyer et al. | 161/234 |
| 3,508,944 | 4/1970 | Henderson et al. | 117/7 |
| 3,620,825 | 11/1971 | Lohmann et al. | 117/138.8 E |
| 3,660,150 | 5/1972 | Cooper | 117/138.8 E |
| 3,660,152 | 5/1972 | Cooper | 117/138.8 E |

FOREIGN PATENTS OR APPLICATIONS

| | | | |
|---|---|---|---|
| 860,271 | 1/1971 | Canada | |
| 1,177,325 | 9/1964 | Germany | 117/138.8 E |
| 615,602 | 2/1961 | Canada | 117/138.8 E |

*Primary Examiner*—P. E. Willis, Jr.
*Attorney, Agent, or Firm*—Johnston, Keil, Thompson & Shurtleff

[57] ABSTRACT

Method of coating shaped articles of plastics which show a tendency to stick at ordinary temperatures, comprising the application of molten polyethylene, polypropylene, copolymers of ethylene and propylene or mixtures of said polymers having a molecular weight of from 2,000 to 20,000.

5 Claims, No Drawings

METHOD OF COATING SHAPED ARTICLES

The present invention relates to a method of coating shaped articles of plastics which tend to stick at ordinary temperatures, comprising the application of non-tacky thermoplastic materials in a molten state.

German Published Application No. 2,038,980 reveals a method of improving the surface properties of organic polymeric materials such as polyethylene, polypropylene, polybutene, polyisobutylene and copolymers of butylene and styrene. In this method, a solution containing a polar polymer is applied to the surface of the said organic polymeric material and the solvent is then evaporated off. During application and evaporation, the temperature of the surface of the organic polymeric material is below the softening point of said organic polymeric material. Examples of polar polymers which are applied to said organic polymeric materials with the aid of a solvent are copolymers of ethylene and vinyl acetate, methyl acrylate, ethyl acrylate, maleic anhydride, acrylic acid, methacrylic acid or carbon monoxide.

German Published Application No. 1,812,095 reveals a method of coating shaped articles of bitumen and ethylene copolymers comprising the application of an aqueous dispersion of a vinyl chloride polymer or vinylidene chloride polymer to the surface of said shaped articles, which dispersion contains a particulate cured urea/formaldehyde resin or a particulate cured malamine/formaldehyde resin. This prevents the shaped articles obtained from said molding compositions from sticking together. The prior art coatings usually have the disadvantage that they are not effective for a sufficiently long period of time with the result that, say, coated granules of polymers showing a marked tendency to stick to themselves and other objects, form agglomerates when stored for prolonged periods.

It is also known to prevent agglomeration of granules by dusting them with coal dust, lamp black or talcum. However, it is usually necessary to use a distinct excess of particulate parting agent to ensure that the material to be coated is completely enveloped thereby. The method of dusting tacky granules either produces a satisfactory effect for a limited time only or it provides finished products having mechanical properties which differ from those of the said shaped articles which have not been dusted in said manner.

These problems may be avoided by treating the shaped articles with aqueous emulsions of various polymers and condensates, but drying of the shaped articles thus coated is very difficult. Usually, the coatings are not fully effective until they have dried out completely. However, there is still a risk of the treated granules forming agglomerates, as it is necessary in many cases to raise the temperature during drying almost to the softening point of the treated material. Residual water may form bubbles during extrusion of the material and thus cause a considerable loss of quality.

The use of organic solvents involves the added problem of solvent recovery and the additional cost of the necessary safety measures.

It is also possible to blend the tacky polymers with non-adhesive materials such as fillers and non-tacky polymers. In such cases however, it is necessary to mix the tacky material with a considerable amount of the other material. Thus it is known, for example, to blend polyisobutylene with from 10 to 50 percent by weight of a polyethylene or polypropylene and to make shaped articles from the mixture. This measure provides non-tacky blends which are easy to package and process but the properties of the polyisobutylene are changed to such an extent that it can no longer be used in all of its usual applications, for example as an adhesive or a lubricant improver.

It is thus an object of the present invention to provide a method of coating shaped articles of plastics materials which tend to stick at ordinary temperatures comprising the application of a non-tacky thermoplastic material in the molten state, which method is required to avoid the above drawbacks of prior art processes, for example poor efficiency of the coating, pronounced change in the properties of the tacky polymer and complicated application of the coating material.

We have found that this object is achieved by using a low molecular weight polyethylene, polypropylene, copolymer of ethylene and propylene or mixtures of said polymers having a molecular weight of from 2,000 to 20,000.

By shaped articles we mean products which have been produced by, say, extruding, calendering or compression molding plastics materials or plastics mixtures which show a tendency to stick at ordinary temperatures. For example, such shaped articles may be in the form of panels, tubes, sheeting or granules.

The most important plastics materials of this kind are polyisobutylene having a molecular weight of from $3 \times 10^5$ to $5 \times 10^6$ (as determined by the viscosity average) and blends of bitumen and ethylene copolymers. Such blends usually contain from 30 to 95 percent by weight of bitumen having a penetration of from 10 to 200 (as measured by German Standard DIN 1995) and from 5 to 70 percent by weight of a copolymer of from 30 to 97 percent w/w of ethylene and from 70 to 3 percent w/w of vinyl esters and/or copolymerizable acrylic and/or methacrylic compounds. The coating method of the invention may also be applied to copolymers of ethylene containing more than 20 percent by weight of polymerized units of a polar ethylenically unsaturated compound. Particularly important comonomers with the ethylene are vinyl esters of carboxylic acid of from 1 to 6 carbon atoms, acrylates and methacrylates derived from alcohols of from 1 to 8 carbon atoms, fumarates, maleates and the carboxylic acids corresponding to said esters. The ethylene copolymers may contain more than one of said comonomers if desired.

Shaped articles of said polymers are coated with molten low molecular weight polyethylene, polypropylene, ethylene/propylene copolymer or mixtures of said polymers. The molecular weight of the polymer used as coating composition is from 2,000 to 20,000 and preferably from 4,000 to 8,000. The said coating compositions are applied at a rate of from 10 to 2,000 g/m² of shaped article surface.

The coatings may be made more effective by adding inorganic and/or organic materials having a particle size of from 1 to 100 mμ to the said low molecular weight polymers. Examples of inorganic materials are silicon dioxide, calcium carbonate, layer silicates such as talcum and mica and other silicates such as kaolin and lamp black, coal dust and powdered graphite, zinc oxide, calcium oxide, titanium dioxide, metal powder, magnesia and glass micro-spheres. Examples of organic materials are zinc stearate, dyes, pigments, powdered polyolefins and polysaccharides.

High molecular weight polyisobutylene is known to be a tough, sticky mass which behaves as a viscous liquid when subjected to pressure. As a result, shaped articles of polyisobutylene cake together during storage. According to the present invention, shaped articles of polyisobutylene and other plastics materials which show a tendency to stick at ordinary temperatures are provided with a non-tacky coating by applying a molten low molecular weight polyolefin thereto. The method of the invention is primarily applied to granules or panels of polyisobutylene. The molten coating material is applied to said shaped articles to be coated in conventional apparatus, for example stirrer units, fluidized bed apparatus, shaker troughs, vibratory sieves, screw conveyors, conveyor belts, drop shafts and spray towers and above all in coating drums with or without baffles. The molten material may also be applied in the form of fine droplets or an aerosol. The working temperature is between room temperature and 300°C and preferably between 50° and 180°C. To achieve a particularly good coating, it is advantageous to heat the shaped articles to be coated in a stream of hot air prior to coating. When using this procedure, it is advisable to adjust the temperature of the material to be coated to at least 5°C above the melting point of the coating composition.

The optimum rate of application of the parting agent may be readily determined by preliminary tests. The parting agent may be applied to the shaped articles in a single operation or in a number of stages. In the latter case, it is advantageous to allow the material applied in one stage to set before the next stage is carried out. The parting agent may contain dyes, stabilizers and other additives. The shaped articles are preferably coated at a rate of from 20 to 500 g/m² so that the thickness of the coating produced on the shaped articles is from 0.02 to 0.5 mm.

The process of the invention has the advantage that coating may be carried out in a single stage. It is no longer necessary to evaporate solvents or, as in the case of dispersions, to dry the shaped articles after coating. The process is further described in the following Examples, in which parts and percentages are by weight.

EXAMPLE 1

Panels having the dimensions 150 × 75 × 5 mm are compression molded from a polyisobutylene having a molecular weight of 1,300,000 (as determined by the viscosity average). Two panels are coated with a 550 μm layer of wax (applied at the rate of 500 g/m² of polyisobutylene surface). The wax used is a polyethylene wax having a molecular weight of 5,000. The wax is melted in an electrically heated reservoir of a commercial spraygun (3 mm nozzle) and is air-sprayed onto the panels. After the wax has cooled, the panels are placed together and subjected to a load of 0.2 kg/cm² for 60 hours. After this period, the force required to separate the panels in the longitudinal direction is 0.2 kg.

COMPARATIVE EXAMPLE 1

Two uncoated polyisobutalene panels of the kind used in Example 1 are placed together and subjected to a load of 0.2 kg/cm². After a period under load of 60 hours, it is no longer possible to part the panels without damaging one or other of them, since they have become stuck together.

EXAMPLE 2

Panels having the dimensions 150 × 75 × 5 mm are made, as in Example 1, from an isobutylene copolymer containing 2 percent by weight of isoprene and having a molecular weight of 2,700,000 (as determined by the viscosity average). Two panels are coated with 500 g of a polyethylene wax per square meter. The polyethylene wax has a molecular weight of 3,000. The panels are placed together and subjected to a load of 0.15 kg/cm² for 10 days. The force required to separate the panels is 0.2 kg.

EXAMPLE 3

Panels are made from a polyisobutylene having a molecular weight of 4,700,000 in the manner described in Example 1. The panels are coated with a polypropylene wax having a molecular weight of 7,000. The wax is applied at a rate of 500 g/m² of polyisobutylene surface. Two panels are placed together and subjected to a load 0.1 kg/cm² for 20 days. The force required to part the panels in the longitudinal direction is 0.2 kg.

EXAMPLE 4

95 parts of cylindrical granules (maximum diameter 10 mm) of a polyisobutylene having a molecular weight of 1,200,000 (as determined by the viscosity average) are charged into an inclined coating drum provided with driving means. The granules are heated to 130°C by blowing in hot air. 5 parts of a polyethylene wax melt are then sprayed onto the granules over 5 minutes. The wax has a molecular weight of 8,000 and the temperature of the molten wax is 180°C. 5 minutes after application of the wax, the coated granules are cooled by blowing cold air. The resulting granules are still free-flowing after storage for 30 days.

If cylindrical granules (max. diameter 10 mm) of a polyisobutylene having a molecular weight of 1,200,000 are stored as such, the particles stick together after 2 days.

We claim:

1. A method of coating shaped articles of polyisobutylene having a molecular weight of from $3 \times 10^5$ to $6 \times 10^6$ (viscosity average) which comprises applying to the surface of said shaped article as a coating composition from 10 to 2000 g/m² of shaped article surface of molten polyethylene, polypropylene, ethylene/propylene copolymer or mixtures of said polymers having a molecular weight of from 2,000 to 20,000.

2. A method as set forth in claim 1 wherein said shaped articles are heated in a stream of hot air prior to the coating step whereby the temperature of the shaped articles is at least 5°C above the melting point of the coating composition.

3. A method as set forth in claim 2 wherein said coating composition is applied at a rate of from 20 to 500 g/m² and wherein said coating composition has a molecular weight of from 4,000 to 8,000.

4. A method as set forth in claim 2 wherein a material having a particle size of from 1 to 100 mμ is incorporated in said coating composition and applied to said shaped surface, said material being selected from the group consisting of silicon dioxide, calcium carbonate, talcum, mica, kaolin, lamp black, coal dust, powdered graphite, zinc oxide, calcium oxide, titanium dioxide, metal powder, magnesia, glass micro-spheres, zinc stearate, dyes, pigments, powdered polyolefins and polysaccharides.

5. A shaped article of polyisobutylene having a molecular weight of from $3 \times 10^5$ to $6 \times 10^6$ (viscosity average), said shaped article being coated with a material selected from the group consisting of polyethylene, polypropylene, ethylene/propylene copolymer or mixtures of said polymers having a molecular weight of from 2,000 to 20,000, the thickness of said coating being from 0.02 to 0.5 mm.

* * * * *